(12) United States Patent
Douady et al.

(10) Patent No.: US 10,893,218 B1
(45) Date of Patent: Jan. 12, 2021

(54) SYSTEMS AND METHODS FOR GENERATING PANORAMIC VISUAL CONTENT

(71) Applicant: GoPro, Inc., San Mateo, CA (US)

(72) Inventors: César Douady, Orsay (FR); Alexis Lefebvre, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/577,069

(22) Filed: Sep. 20, 2019

(51) Int. Cl.
| H04N 5/232 | (2006.01) |
| H04N 5/262 | (2006.01) |
| H04N 5/225 | (2006.01) |
| G06T 3/00 | (2006.01) |
| G06K 9/00 | (2006.01) |
| G06T 3/40 | (2006.01) |

(52) U.S. Cl.
CPC ....... *H04N 5/2628* (2013.01); *G06K 9/00711* (2013.01); *G06T 3/0062* (2013.01); *G06T 3/4038* (2013.01); *H04N 5/2254* (2013.01); *H04N 5/23238* (2013.01)

(58) Field of Classification Search
CPC .............. H04N 5/2628; H04N 5/2254; H04N 5/23238; G06K 9/00711; G06T 3/0062; G06T 3/4038
See application file for complete search history.

(56) References Cited

U.S. PATENT DOCUMENTS

| 10,587,855 | B1* | 3/2020 | Chinnaiyan | ........ G06K 9/00228 |
| 2015/0254871 | A1* | 9/2015 | MacMillan | ............. G06T 7/246 |
| | | | | 382/180 |
| 2017/0118458 | A1* | 4/2017 | Grnholm | .............. H04N 13/156 |
| 2017/0227841 | A1* | 8/2017 | Niemela | ................ G03B 35/08 |
| 2019/0238609 | A1* | 8/2019 | Skupin | ............. H04N 21/23439 |
| 2020/0037029 | A1* | 1/2020 | He | ........................ H04N 21/816 |
| 2020/0128280 | A1* | 4/2020 | Han | ................... H04N 21/6587 |

* cited by examiner

*Primary Examiner* — John R Schnurr
(74) *Attorney, Agent, or Firm* — Esplin & Associates, PC

(57) ABSTRACT

An image or a video may include a spherical capture of a scene. A punchout of the image or the video may provide a panoramic view of the scene.

18 Claims, 13 Drawing Sheets

SYSTEMS AND METHODS FOR GENERATING PANORAMIC VISUAL CONTENT

FIELD

This disclosure relates to generating panoramic visual content from spherical visual content.

BACKGROUND

A panoramic view of a scene may be captured by panning an image capture device over a time duration. A large field of view of the scene may be captured within a number of images, which may then be stitched into a single panoramic image. Such generation of panoramic image may result in numerous stitching artifacts within the panoramic image. Such generation of panoramic image may result in intra-frame motion within the panoramic image due to motion of one or more things in the scene during panning of the image capture device over the time duration.

SUMMARY

This disclosure relates to generating panoramic visual content. Visual information and/or other information may be obtained. The visual information may define visual content captured by an image capture device. The visual content may have a spherical field of view. Placement of a viewing window within the spherical field of view of the visual content may be determined. The viewing window may define an extent of the visual content to be included within a punchout of the visual content. The viewing window may have a panoramic field of view. The panoramic visual content may be generated based on the viewing window and/or other information. The panoramic visual content may include the punchout of the extent of the visual content within the viewing window.

A system that generates panoramic visual content may include one or more electronic storages, one or more processors, and/or other components. An electronic storage may store visual information defining visual content, information relating to visual content, information relating to a viewing window, information relating to placement of viewing window, information relating to a punchout of visual content, information relating to panoramic visual content, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate generating panoramic visual content. The machine-readable instructions may include one or more computer program components. The computer program components may include one or more of a visual information component, a viewing window component, a generation component, and/or other computer program components.

The visual information component may be configured to obtain visual information and/or other information. The visual information may define visual content captured by one or more image capture devices. The visual content may have a spherical field of view. The visual content having a spherical field of view may be viewable from a point of view.

In some implementations, the visual information may define the visual content of a spherical video. The spherical video may have a progress length. The visual content may be defined by the visual information as a function of progress through the progress length.

In some implementations, the visual content of the spherical video may be rotated as the function of progress through the process length based on rotational positions of the image capture device during capture of the visual content and/or other information. The rotation of the visual content may result in the visual content being oriented in a top-down manner such that the visual content is aligned with a direction of gravity on the image capture device during capture of the visual content.

In some implementations, the visual content having the spherical field of view may be generated based on stitching of first visual content, second visual content, and/or other visual content. The first visual content may be captured using a first optical element of the image capture device, and the second visual content may be captured using a second optical element of the image capture device. The first optical element may have a first field of view, and the second optical element may have a second field of view. The first optical element and the second optical element may be carried by the image capture device such that a peripheral portion of the first field of view and a peripheral portion of the second field of view overlap. The overlap of the peripheral portion of the first field of view and the peripheral portion of the second field of view may enable spherical capture of the visual content. A stitch line for stitching of the first visual content and the second visual content may be positioned within the overlap of the peripheral portion of the first field of view and the peripheral portion of the second field of view.

In some implementations, the visual content may be mapped onto a sphere. In some implementations, the visual content may be mapped onto a two-dimensional plane using an equirectangular projection. The stitch line may be positioned within lateral portions of the visual content mapped onto the two-dimensional plane using the equirectangular projection.

The viewing window component may be configured to determine placement of a viewing window within the spherical field of view of the visual content. The viewing window may define one or more extents of the visual content to be included within a punchout of the visual content. The viewing window may have a panoramic field of view. In some implementations, the panoramic field of view may include a ninety-degree vertical field of view and a two-hundred seventy-degree horizontal field of view.

In some implementations, the placement of the viewing window may be determined be located along a vertical center of the visual content mapped onto the two-dimensional plane using the equirectangular projection.

In some implementations, the placement of the viewing window may be determined be located along a horizontal center of the visual content mapped onto the two-dimensional plane using the equirectangular projection such that the stitch line is positioned closer to a lateral edge of the viewing window than to a center of the viewing window.

In some implementations, the placement of the viewing window may be determined based on identification of one or more things depicted within the visual content and/or other information. The placement of the viewing window may define framing of the thing(s) depicted within the visual content.

In some implementations, the panoramic field of view may change as the function of progress through the progress length to simulate changes in zoom within a panoramic video. In some implementations, the placement of the viewing window may be determined to include a depiction of a horizon within the visual content at a vertical position fixed relative to a height of the viewing window during changing of the panoramic field of view.

The generation component may be configured to generate the panoramic visual content based on the viewing window and/or other information. The panoramic visual content may include the punchout of the extent(s) of the visual content within the viewing window. In some implementations, generation of the panoramic visual content based on the viewing window may include cropping of one or more extents of the visual content outside the viewing window.

In some implementations, the panoramic visual content may be generated as the function of progress through the progress length for inclusion in the panoramic video.

In some implementation, the visual content may be mapped onto a sphere, and generation of the panoramic visual content based on the viewing window includes: rotation of the sphere to position the extent of the visual content defined by the viewing window at a location of the sphere corresponding to a center portion of the visual content mapped onto a two-dimensional plane using an equirectangular projection; and crop of one or more extents of the visual content outside the center portion.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
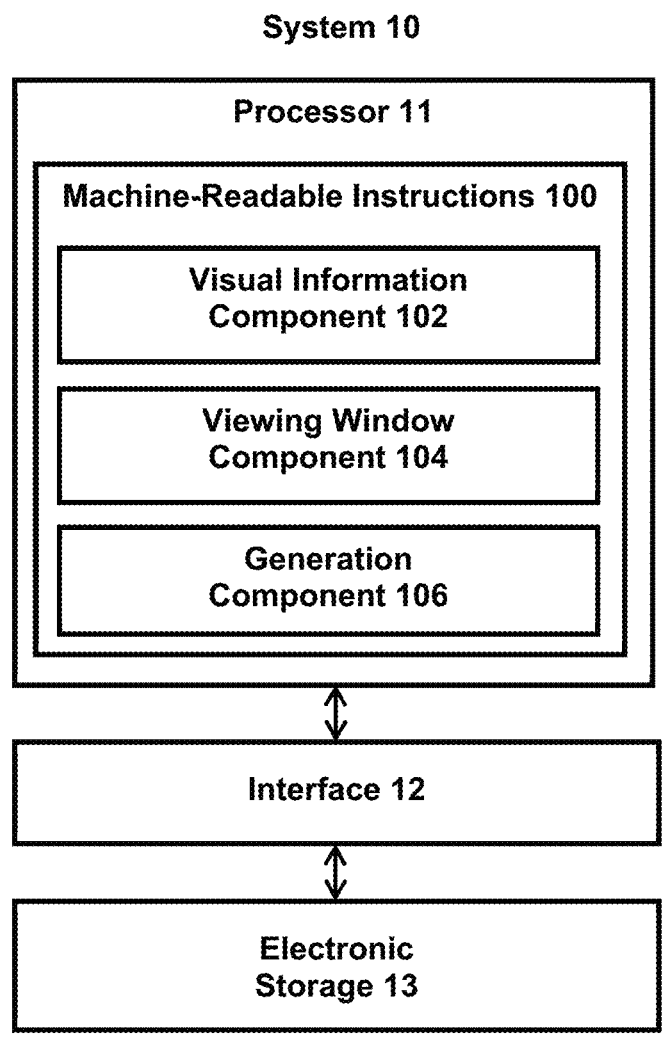
FIG. 1 illustrates an example system that generates panoramic visual content.

FIG. 1 illustrates a system 10 for generating panoramic visual content. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Visual information and/or other information may be obtained by the processor 11. The visual information may define visual content captured by an image capture device. The visual content may have a spherical field of view. Placement of a viewing window within the spherical field of view of the visual content may be determined by the processor 11. The viewing window may define an extent of the visual content to be included within a punchout of the visual content. The viewing window may have a panoramic field of view. The panoramic visual content may be generated by the processor 11 based on the viewing window and/or other information. The panoramic visual content may include the punchout of the extent of the visual content within the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to a viewing window, information relating to placement of viewing window, information relating to a punchout of visual content, information relating to panoramic visual content, and/or other information.

Visual content may refer to content of one or more images and/or one or more videos that may be consumed visually. For example, visual content may be defined within one or more images and/or one or more video frames of a video. For instance, video frame(s) of a video may define the visual content of the video. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Visual information may define visual content and/or other content captured by one or more image capture devices. The visual information may define visual content by including information that defines one or more content, qualities, attributes, features, and/or other aspects of the visual content. For example, the visual information may define visual content of an image, a video frame, and/or a video by including information that makes up the content of the image, the video frame, and/or the video, and/or information that is used to determine the content of the image, the video frame, and/or the video. For instance, the visual information may include information that makes up and/or is used to determine the arrangement of pixels, characteristics of pixels, values of pixels, and/or other aspects of pixels that define visual content of the image, the video frame, and/or the video. For example, the visual information may include information that makes up and/or is used to determine pixels of the image or video frame(s) of the video. Other types of visual information are contemplated.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture).

Spherical visual content may be generated based on light received within a field of view of a single image sensor or within fields of view of multiple image sensors during a capture period. For example, multiple images/videos captured by multiple cameras/image sensors may be combined/stitched together to form the spherical visual content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical visual content.

Figure 3:
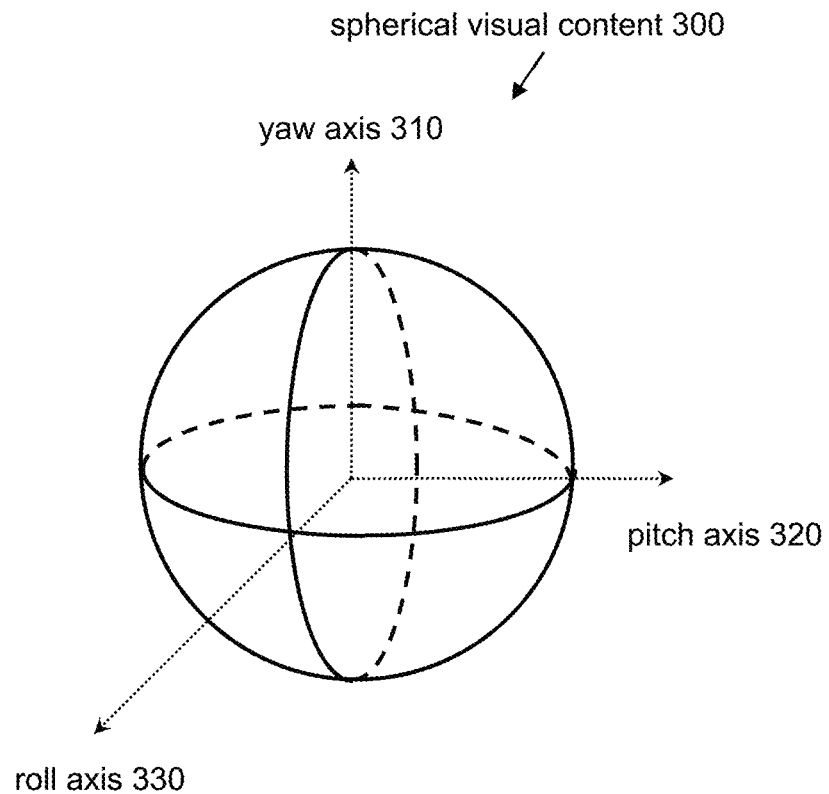
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation around the yaw axis 310 may correspond to a front viewing direction. A 90-degree rotation around the yaw axis 310 may correspond to a right viewing direction. A 180-degree rotation around the yaw axis 310 may correspond to a back-viewing direction. A −90-degree rotation around the yaw axis 310 may correspond to a left viewing direction.

A 0-degree rotation around the pitch axis 320 may correspond to a viewing direction that may be level with respect to horizon. A 45-degree rotation around the pitch axis 320 may correspond to a viewing direction that may be pitched up with respect to horizon by 45-degrees. A 90-degree rotation around the pitch axis 320 may correspond to a viewing direction that may be pitched up with respect to horizon by 90-degrees (looking up). A −45-degree rotation around the pitch axis 320 may correspond to a viewing direction that may be pitched down with respect to horizon by 45-degrees. A −90-degree rotation around the pitch axis 320 may correspond to a viewing direction that may be pitched down with respect to horizon by 90-degrees (looking down).

A 0-degree rotation around the roll axis 330 may correspond to a viewing direction that may be upright. A 90-degree rotation around the roll axis 330 may correspond to a viewing direction that may be rotated to the right by 90-degrees. A −90-degree rotation around the roll axis 330 may correspond to a viewing direction that may be rotated to the left by 90-degrees. Other rotations and viewing directions are contemplated.

A presentation of visual content may include presentation of one or more portions of visual content on one or more displays based on a viewing window and/or other information. An extraction of visual content may include extraction of one or more portions of visual content (e.g., into a cropped image) based on a viewing window and/or other information. A viewing window may define extents of the visual content viewable on one or more displays and/or extents of the visual content to be extracted. For video content, a viewing window may define extents of the visual content as the function of progress through the progress length of the video content. A viewing window may define extents of the visual content presented on the display(s)/extracted as the function of progress through the progress length of the video content. For spherical video content, the viewing window may define extents of the visual content from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. A viewing direction may define a direction of view for the visual content selected by a user, defined by instructions for viewing the visual content, and/or determined based on other information about viewing the visual content. For video content, a viewing direction may be defined as a function of progress through the progress length of the video content (e.g., director track specifying viewing direction to be presented during playback as a function of progress through the progress length of the video content). For spherical visual content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation around a yaw axis (e.g., the yaw axis 310) and a 0-degree rotation around a pitch axis (e.g., the pitch axis 320) may correspond to a front viewing direction (the viewing window may be directed to a forward portion of the visual content captured within the spherical visual content).

Figure 4:
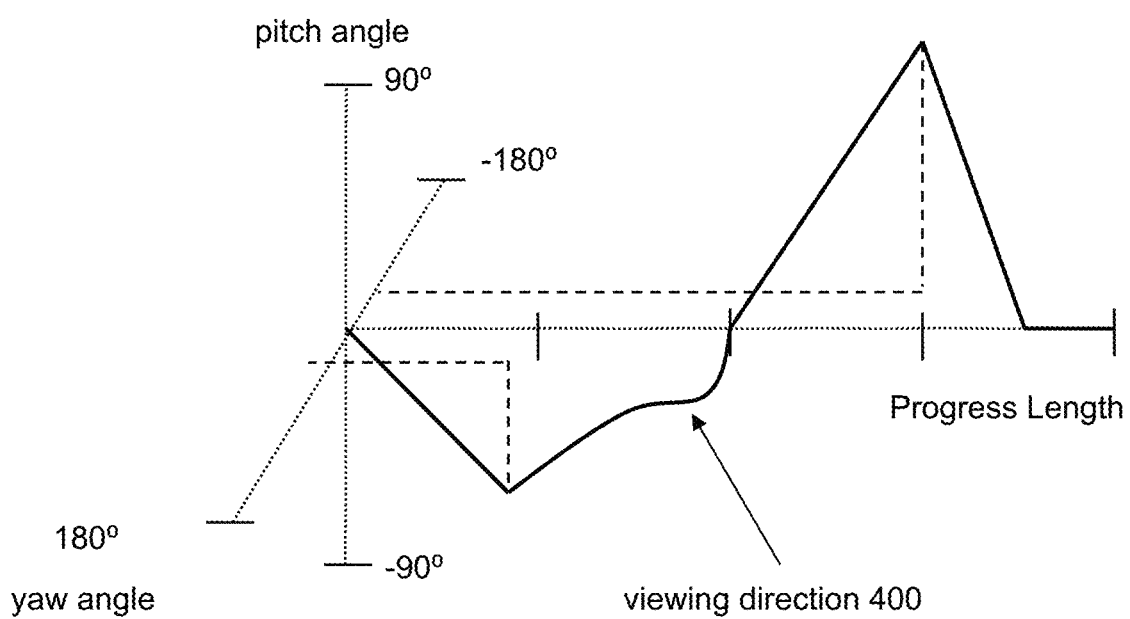
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of the extents of visual content. A viewing size may define the dimensions of the viewing window. A viewing size may define a size of extents of visual content selected by a user, defined by instructions for viewing the visual content, and/or determined based on other information about viewing the visual content. For video content, a viewing size may be defined as a function of progress through the progress length of the video content as a function of progress through the progress length of the video content (e.g., director track specifying viewing size to be presented as a function of progress through progress length of video content). In some implementations, a viewing size may define different shapes of extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the visual content, and/or determined based on other information about viewing the visual content. For video content, a viewing rotation may be defined as a function of progress through the progress length of the video content (e.g., director track specifying viewing rotation to be used as a function of progress through progress length of video content). For example, a viewing rotation of a viewing window having a rectangular shape may determine whether the rectangular viewing window is to be positioned in a portrait orientation (e.g., for a portrait view of the visual content), in a landscape orientation (e.g., for a landscape view of the visual content), and/or other orientation with respect to the visual content.

Figures 5A, 5B:
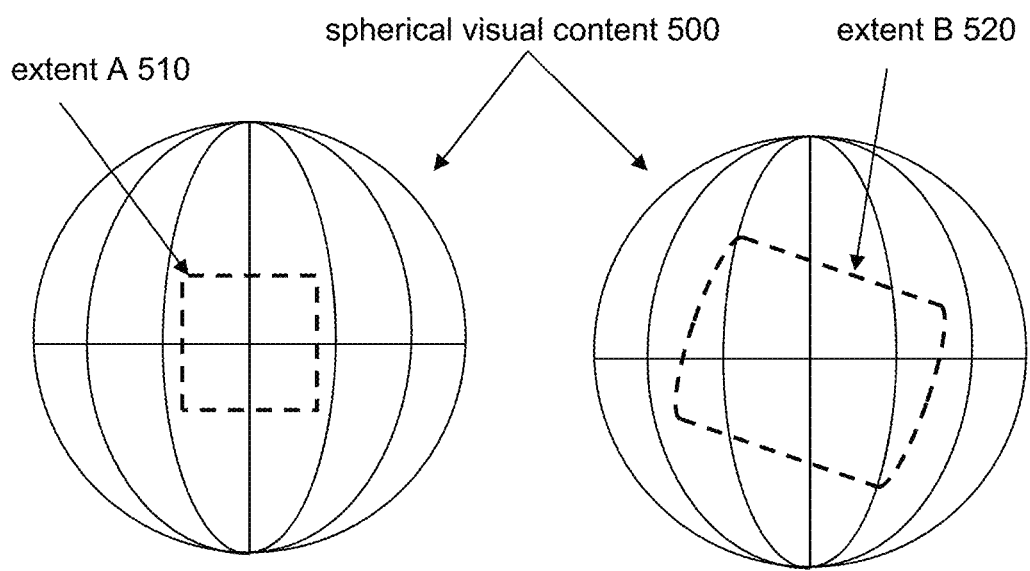
FIGS. 5A-5B illustrate example extents of spherical visual content.

FIGS. 5A-5B illustrate examples of extents for spherical visual content 500. In FIG. 5A, the size of the extent of the spherical visual content 500 may correspond to the size of extent A 510. In FIG. 5B, the size of extent of the spherical visual content 500 may correspond to the size of extent B 520. Extent of the spherical visual content 500 in FIG. 5A may be smaller than extent of the spherical visual content 500 in FIG. 5B. The extent of the spherical visual content 500 in FIG. 5B may be more tilted with respect to the spherical visual content 500 than extent of the spherical visual content 500 in FIG. 5A. Other viewing sizes and viewing rotations are contemplated.

Figure 6:
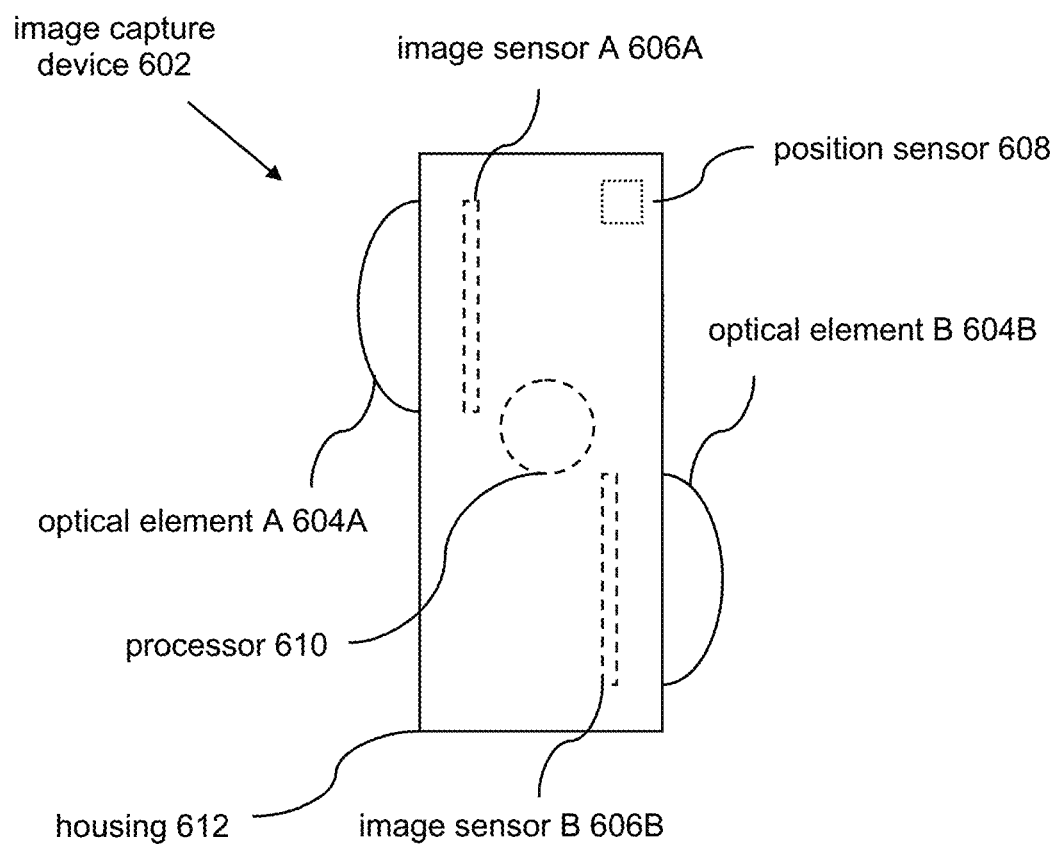
FIG. 6 illustrates an example image capture device.

An image capture device may refer to a device captures visual content. An image capture device may capture visual content in form of images, videos, and/or other forms. For example, an image capture device may refer to a camera and/or an image sensor. An image capture device may be a standalone device (e.g., camera) or may be part of another device (e.g., part of a smartphone). FIG. 6 illustrates an example image capture device 602. Visual content may be captured by the image capture device 602 during a capture duration. The image capture device 602 may include a housing 612, and the housing 612 may carry (be attached to, support, hold, and/or otherwise carry) one or more of an optical element A 604A, an optical element B 604B, an image sensor A 606A, an image sensor B 606B, a position sensor 608, a processor 610, and/or other components. In some implementations, an image capture device may include a non-spherical image capture device. Other configurations of image capture devices are contemplated.

One or more components of the image capture device 602 may be the same as, be similar to, and/or correspond to one or more components of the system 10. For example, the processor 610 may be the same as, be similar to, and/or correspond to the processor 11.

The optical elements 604A, 604B may include instrument (s), tool(s), and/or medium that acts upon light passing through the instrument(s)/tool(s)/medium. For example, the optical elements 604A, 604B may include one or more of lens, mirror, prism, and/or other optical elements. The optical elements 604A, 604B may affect direction, deviation, and/or path of the light passing through the optical elements 604A, 604B. While the optical elements 604A, 604B are shown in a staggered configuration, this is merely an example and other configurations of optical elements are contemplated.

The image sensors 606A, 606B may include sensor(s) that converts received light into output signals. The output signals may include electrical signals. The image sensors 606A, 606B may generate output signals conveying information that defines visual content of one or more images and/or one or more video frames of a video. For example, the image sensors 606A, 606B may include one or more of a charge-coupled device sensor, an active pixel sensor, a complementary metal-oxide semiconductor sensor, an N-type metal-oxide-semiconductor sensor, and/or other image sensors.

The image sensors 606A, 606B may be configured to generate output signals conveying visual information (defining visual content of images and/or videos) based on light that becomes incident thereon and/or other information. The optical element A 604A may be configured to guide light within a field of view to the image sensor A 606A, and the image sensor A 606A may be configured to generate output signals conveying visual information based on light that becomes incident thereon via the optical element A 604A. The optical element B 604B may be configured to guide light within a field of view to the image sensor B 606B, and the image sensor B 606B may be configured to generate output signals conveying visual information based on light that becomes incident thereon via the optical element B 604B. The fields of view of the optical elements 604A, 604B may refer to the extents of the observable world that is seen through the optical elements 604A, 604B. The field of views of the optical elements 604A, 604B may include one or more angles (e.g., vertical angle, horizontal angle, diagonal angle) at which light is received and passed on by the optical elements 604A, 604B. The fields of view of the optical elements 604A, 604B may be the same or different.

The fields of view of the optical elements 604A, 604B may be greater than or equal to 180-degrees. The optical elements 604A, 604B may be carried by the housing 312 such that peripheral portions of the fields of view of the optical elements 604A, 604B overlap. The overlap of the peripheral portions of the fields of view of the optical elements 604A, 604B may enable capture of spherical visual content (e.g., of images and/or videos) based on the visual information conveyed by the output signals of the image sensors 606A, 606B. That is, the overlap of the peripheral portions of the fields of view of the optical elements 604A, 604B may enable spherical capture of visual content based on visual content defined by the visual information of the image sensor A 606A (visual content captured by the image sensor A 606A) and visual content defined by the visual information of the image sensor B 606B (visual content captured by the image sensor B 606B). Separate visual content captured by the image sensors 606A, 606B may be stitched along one or more stitch lines. A stitching line for stitching separate visual content captured by the image sensors 606A, 606B may be positioned within the overlap of the peripheral portions of the fields of view of the optical elements 604A, 604B.

The position sensor 608 may include sensor(s) that measures experienced positions (e.g., orientations) and/or motions (rotations). The position sensor 608 may convert experienced positions and/or motions into output signals. The output signals may include electrical signals. For example, the position sensor 608 may refer to a set of position sensors, which may include one or more inertial measurement units, one or more accelerometers, one or more gyroscopes, one or more magnetometers, one or more global positioning systems, and/or other position sensors. The position sensor 608 may generate output signals conveying information that characterizes positions and/or motions of the position sensor 608 and/or device(s) carrying the position sensor 608, such as the image capture device 602 and/or the housing 612. For example, the position sensor 608 may generate output signals conveying information that characterizes orientations and/or rotations of the position sensor 608 and/or device(s) carrying the position sensor 608, such as the image capture device 602 and/or the housing 612.

For example, the position sensor 608 may be configured to generate a position output signal based on positions of the housing 612/image capture device 602 during the capture duration. The position output signal may convey position information that characterizes positions of the image capture device 602 at different moments (points in time, time durations) within the capture duration. The position information may characterize positions of the image capture device 602 based on specific translational and/or rotational positions of the image capture device 602 and/or based on changes in translational and/or rotational positions of the image capture device 602 as a function of progress through the capture duration. That is, the position information may characterize translational and/or rotational positions of the image capture device 602 and/or changes in translational and/or rotational positions (motion, rotation) of the image capture device 602 (e.g., direction, amount, velocity, acceleration) during the capture duration. The position information may characterize direction of gravity on the image capture device 602 as a function of progress through the capture duration.

The position information may be determined based on signals generated by the position sensor 608 and independent of the information/signals generated by the image sensors 606A, 606B. That is, position information may be determined without using visual content/images/videos generated by the image sensors 606A/606B. Use of visual content/images/videos to determine positions/motions of the image capture device 602 may be computationally expensive in terms of processing power, processing time, and/or battery consumption. Using the information/signals from the position sensor 608 to determine positions/motions of the image capture device 602 may be computationally cheaper. That is, less processing power, processing time, and/or battery consumption may be required when positions/motions of the image capture device 602 are determined from the information/signals from the position sensor 608 than the information/signals from the image sensors 606A, 606B. In some implementations, visual content/images/videos may be analyzed for other reasons. Such analysis of the visual content/images/video may be leveraged to improve the precision and/or reliability of position information and/or image capture device position (e.g., orientation) estimation. For example, visual analysis performed independent of determination of the position information may be used in addition to the position information determined based on outputs of the position sensor 608 to improve estimation of the image capture device position/motion (e.g., orientation, rotation).

The processor 610 may include one or more processors (logic circuitry) that provide information processing capabilities in the image capture device 602. The processor 610 may provide one or more computing functions for the image capture device 602. The processor 610 may operate/send command signals to one or more components of the image capture device 602 to operate the image capture device 602. For example, the processor 610 may facilitate operation of the image capture device 602 in capturing image(s) and/or video(s), facilitate operation of the optical elements 604A, 604B (e.g., change how light is guided by the optical elements 604A, 604B), and/or facilitate operation of the image sensors 606A, 606B (e.g., change how the received light is converted into information that defines images/ videos and/or how the images/videos are post-processed after capture).

The processor 610 may obtain information from the image sensors 606A, 606B and/or the position sensor 608, and/or facilitate transfer of information from the image sensors 606A, 606B and/or the position sensor 608 to another device/component. The processor 610 may be remote from the processor 11 or local to the processor 11. One or more portions of the processor 610 may be part of the processor 11 and/or one or more portions of the processor 11 may be part of the processor 610. The processor 610 may include and/or perform one or more functionalities of the processor 11 shown in FIG. 1.

Referring back to FIG. 1, the system 10 may be remote from an image capture device or local to the image capture device. One or more portions of an image capture device may be remote from or a part of the system 10. One or more portions of the system 10 may be remote from or a part of an image capture device. For example, one or more components of the system 10 may be carried by a housing, such as a housing of an image capture device. For instance, optical element(s), image sensor(s), and/or position sensor (s) of the system 10 may be carried by the housing of the image capture device. The housing may carry other components, such as the processor 11, the electronic storage 13. References to a housing of an image capture device may refer to the image capture device, and vice versa. For example, references to position/motion of a housing of an image capture device may refer to position/motion of the image capture device, and vice versa.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating panoramic visual content. The machine-readable instructions 100 may include one or more computer program components. The machine-readable instructions 100 may include one or more of a visual information component 102, a viewing window component 104, a generation component 106, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device). Visual information may be obtained during acquisition of the visual content and/or after acquisition of the visual content by one or more image capture devices. For example, the visual information component 102 may obtain visual information defining visual content while the visual content is being captured by an image capture device. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video/image editing application, video player/image viewer application), and/or other information. For example, a user interface/application may provide option(s) for a user to select one or more visual content from which panoramic visual content are to be generated. The visual information defining the visual content may be obtained based on the user's selection of the visual content through the user interface/application. Other selections of visual content for retrieval of visual information are contemplated.

Figure 7:
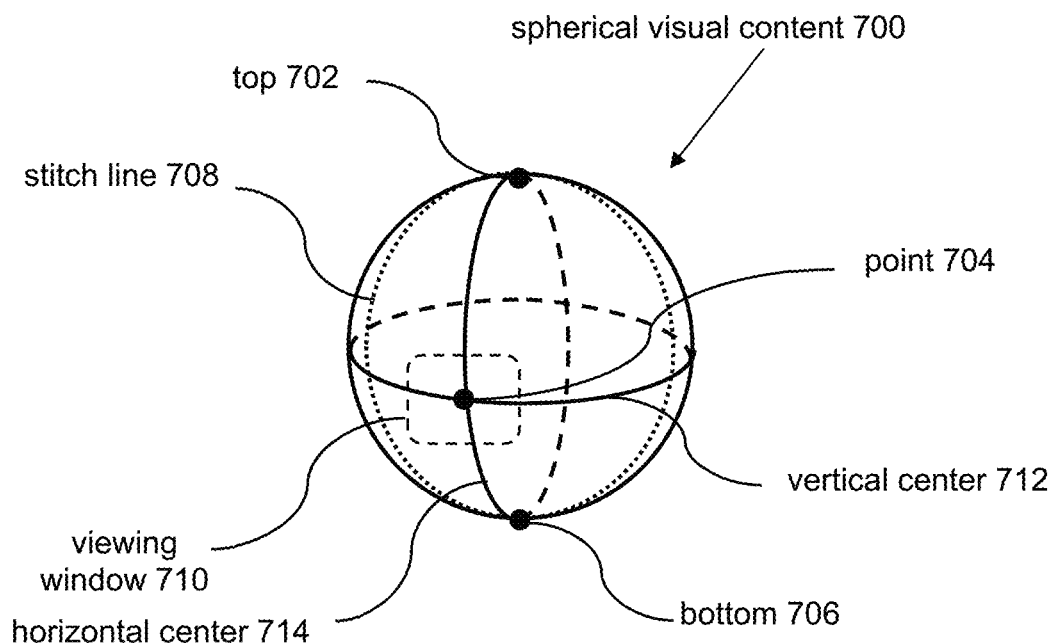
FIG. 7 illustrates example spherical visual content mapped onto a sphere.

The visual information may define visual content captured by one or more image capture devices. The visual content may have a spherical field of view. The visual content having a spherical field of view may be viewable from a point of view (e.g., center of sphere). FIG. 7 illustrates example spherical visual content 700. The spherical field of view of the spherical visual content 700 may include a hundred eighty-degree vertical field of view and a three-hundred sixty-degree horizontal field of view. The spherical visual content 700 may be mapped onto a sphere. The spherical visual content 700 mapped onto the sphere in the image sensor space/three-dimensional space. The spherical visual content 700 may be mapped onto the image space/two-dimensional space using one or more projections (equirectangular projection, equi-angular cubemap projection, stereographic projection) for storage, for presentation (e.g., on a two-dimensional display), and/or for extraction.

In some implementations, the visual information may define the visual content of a spherical video. The spherical video may have a progress length. The visual content may be defined by the visual information as a function of progress through the progress length. For example, the visual information may define visual content of video frames of the spherical video, with the video frames being associated with different moments within the progress length.

In some implementations, the visual content (e.g., of a spherical video/spherical image) may be modified based on positions (e.g., rotational positions) of the image capture device(s) during the capture duration. Modification of the visual content may include one or more changes to visual characteristics of the visual content, such as one or more changes in pixel locations and/or pixel intensities. Modification of the visual content may include one or more of rotation of the visual content, warping of the visual content, and/or other modification of the visual content. The modification of the visual content may be performed in the sensor space/3D space. Rotation of the visual content may include change in how the visual content is oriented. The visual content may be rotated to compensate for different rotational positions of the image capture device during the capture duration. Warping of the visual content may include visual manipulation of one or more portions of the visual content. Visual content may be warped to compensate for different perspectives captured within the visual content due to motion of the image capture device during the capture duration. Visual content may be warped to provide rolling shutter compensation.

In some implementations, the visual content may be modified to provide horizon leveling for the visual content. Horizon-leveling visual content may refer to modifying (e.g., rotating, warping) the visual content to so that the visual content depicts a leveled scene. Horizon-leveling visual content may refer to modifying the visual content to include depiction of a scene that is leveled with respect to ground, earth, and/or the horizon. Horizon-leveling visual content may refer to modifying the visual content to depict a scene which appears to have been captured by an upright image capture device (non-tilted image capture device).

For example, the visual content may be rotated based on rotational position of the image capture device(s) (e.g., orientation of the image capture device with respect to ground and/or gravity direction) during capture of the visual content and/or other information. For a spherical video, the visual content may be rotated as the function of progress through the process length based on rotational positions of the image capture device(s) during the capture duration.

For example, the visual content may be rotated based on the rotational position of the image capture device(s) to be oriented in a top-down manner and/or other orientations. A top-down manner may include the visual content may oriented so that upward depictions (e.g., depiction of sky) are located at the top while downward depictions (e.g., depiction of ground) are located at the bottom. The rotation of the visual content may result in the visual content being oriented in a top-down manner such that the visual content is aligned with a direction of gravity on the image capture device(s) during capture of the visual content. For example, readings from the position sensor may be used to determine the direction of gravity when visual content is captured (during capture duration). The direction of gravity may be used to determine the amount and/or direction of rotation that needs to be applied to the visual content to level the depiction within the visual content. For example, the visual content may be rotated so that the direction of gravity is pointed downwards.

Figure 12:
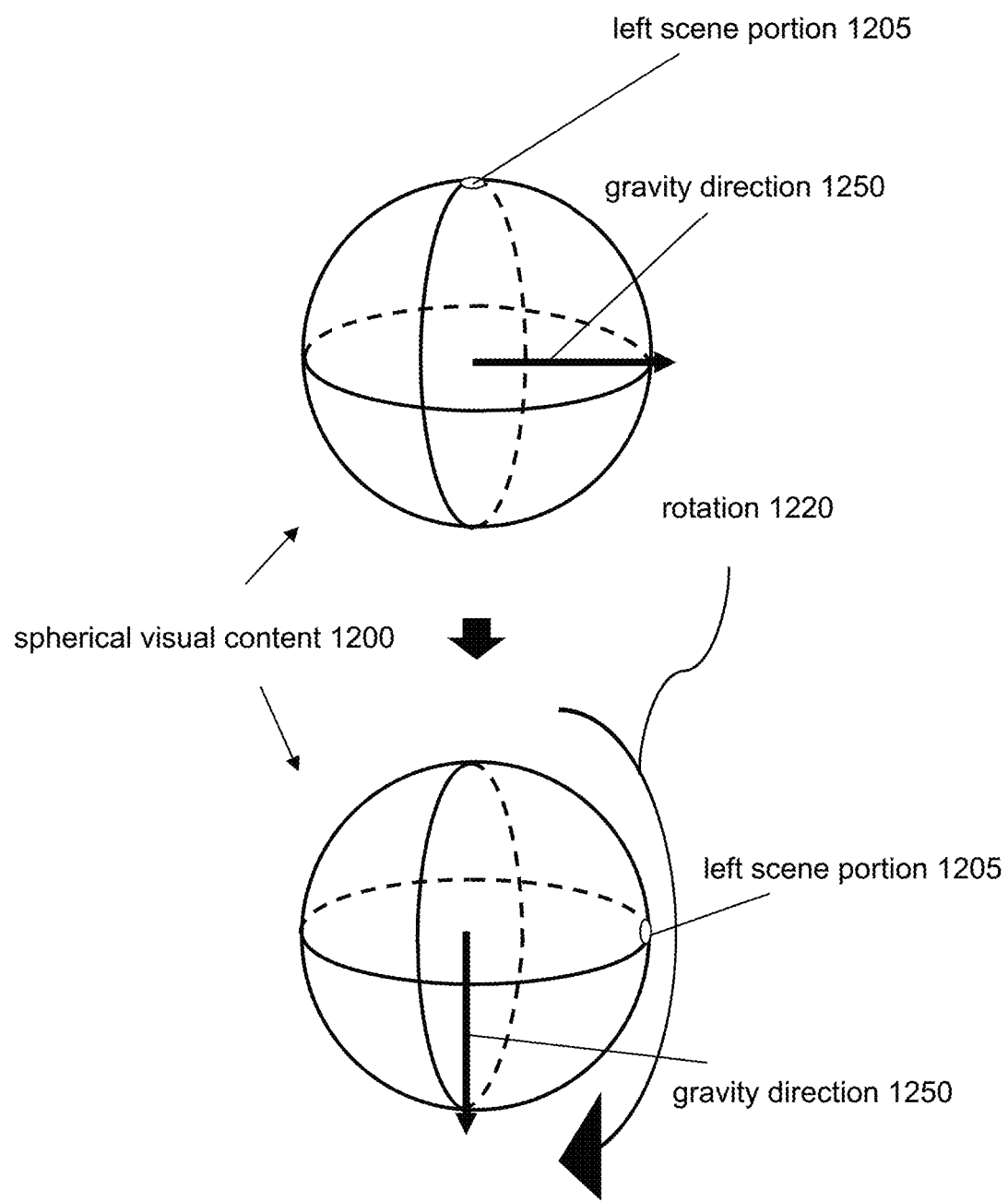
FIG. 12 illustrates example rotation of spherical visual content.

For instance, FIG. 12 illustrates example rotation of spherical visual content 1200. The spherical visual content 1200 may have been captured by an image capture device that was rotated (about a roll axis) by 90 degrees. The gravity direction on the image capture device during capture of the visual content 1200 is shown by an arrow 1250. Capture of the spherical visual content 1200 by the rotated image capture device may have resulted in depiction of left scene portion 1205 to be located at the top of the sphere. The spherical visual content 1200 may be rotated by a rotation 1220 so that the spherical visual content 1200 is oriented in a top-down manner. In the top-down manner, the depiction of left scene portion 1205 may be located at the lateral (left) portion of the sphere. In the top-down manner, the spherical visual content 1200 may be aligned with the direction of gravity (indicated by the gravity direction 1250) on the image capture device during capture duration.

In some implementations, the visual content (e.g., of a spherical video/spherical image) may be modified to provide direction locking for the visual content. Direction locking visual content may refer to (e.g., rotating, warping) the visual content so that the visual content depicts a scene in the same direction. Direction locking visual content may refer to modifying the visual content to include depiction of a scene that is oriented in the same direction (e.g., forward direction of the image capture device, compass direction). Direction locking visual content may refer to modifying the visual content to depict a scene which appear to have been captured by an image capture device pointed in single direction (e.g., forward direction, north direction).

For example, the visual content may be rotated based on the rotational position of the image capture device(s) to be direction locked such that the visual content does not include lateral rotations (e.g., rotations about the yaw axis 310). For example, readings form the position sensor may be used to determine left and/or right rotation of an image capture device when visual content is captured (during capture duration). The left and/or right rotation of the image capture device may be used to determine the amount and/or direction of rotation that needs to be applied to the visual content to depict the scene in the same direction. For example, the visual content may be rotated so that the front portion of the visual content depicts a particular direction (e.g., forward direction, north direction).

Figure 13:
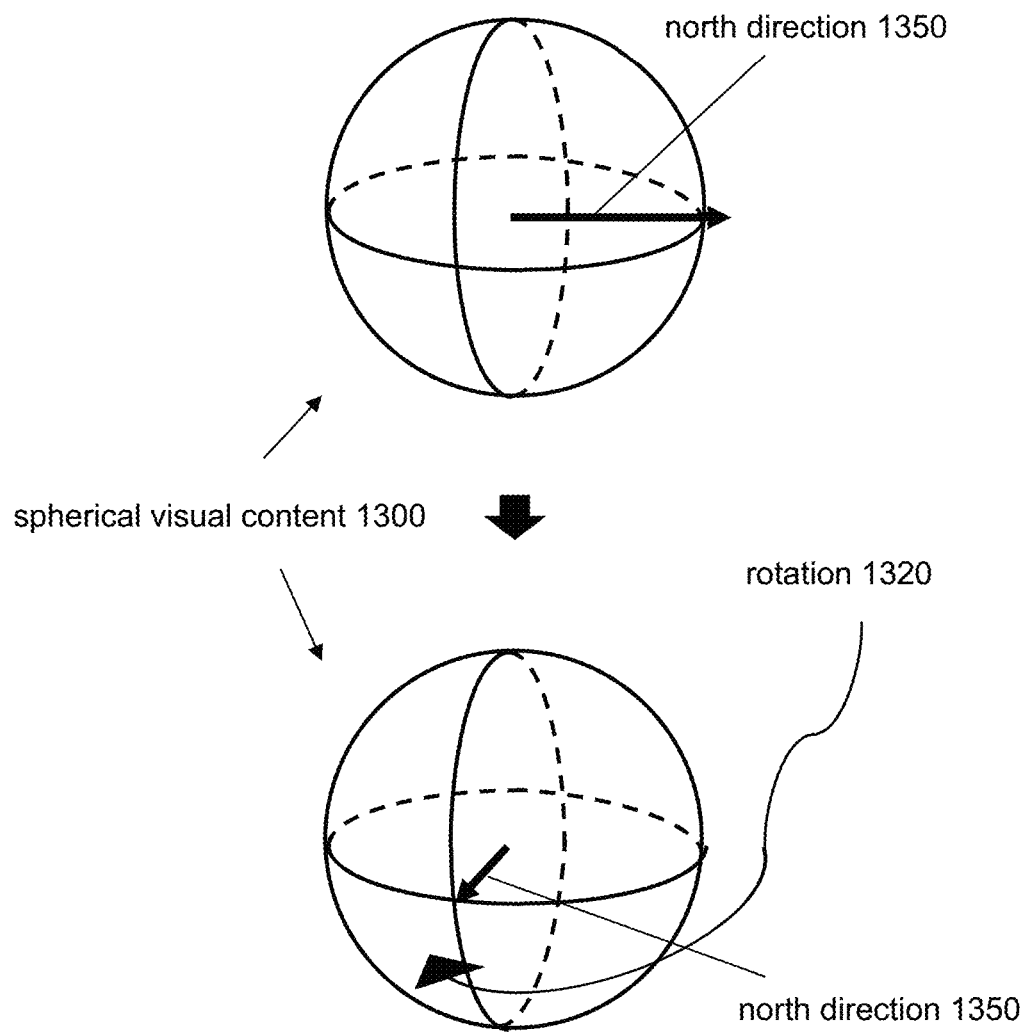
FIG. 13 illustrates example rotation of spherical visual content.

For instance, FIG. 13 illustrates example rotation of spherical visual content 1300. The spherical visual content 1300 may have been captured by an image capture device that was rotated (about a yaw axis) by 90 degrees. The north direction for the image capture device during capture of the visual content 1300 is shown by an arrow 1350. Capture of the spherical visual content 1300 by the rotated image capture device may have resulted in depiction of north scene portion to be located at the lateral (left) portion of the sphere. The spherical visual content 1300 may be rotated by a rotation 1320 so that the spherical visual content 1300 is pointed in the north direction. The depiction of north scene portion may be located at the front portion of the sphere.

Referring back to FIG. 7, the spherical visual content 700 (having the spherical field of view) may be generated based on stitching of multiple visual content. For example, one hemispherical visual content (e.g., front hemispherical visual content, right hemispherical visual content) may be captured using one optical element of an image capture device, and another (opposing) hemispherical visual content (e.g., back hemispherical visual content, left hemispherical visual content) may be captured using another optical element of the image capture device. The optical elements may be carried by the image capture device such that peripheral portions of the fields of view of the optical elements overlap. The overlap of the peripheral portions of the fields of view may enable spherical capture of the spherical visual content 700. A stitch line for stitching of multiple visual content may be positioned within the overlap of the peripheral portions of the fields of view of the optical element. For example, in FIG. 7, stitching front hemispherical visual content and back hemispherical visual content may be performed using a stitch line 708.

In some implementations, the visual content may be mapped onto a two-dimensional plane using one or more projections. A projection may define arrangement of pixels that define the visual content. How pixels are arranged to form the visual content may depend on projection of the visual content. Projection of visual content may refer to how portions of the visual content/pixels are mapped onto a two-dimensional plane (e.g., two-dimensional image). For example, a projection may arrange pixels of an image such that one or more visual elements (defined by one or more pixels) of the visual content within the image are stretched (e.g., at the top or bottom of an image arranged using an equirectangular projection). Example projections may include rectilinear projection, cylindrical projection, Mercator projection, Miller projection, Lambert projection, equirectangular projection, equi-angular cubemap projection, stereographic projection, fisheye projection, equisolid projection, orthographic projection, cubic projection, sinusoidal projection, transverse projection (rotation of a projection by 90 degrees), Panini projection, architectural projection, and/or other projections.

Figure 8:
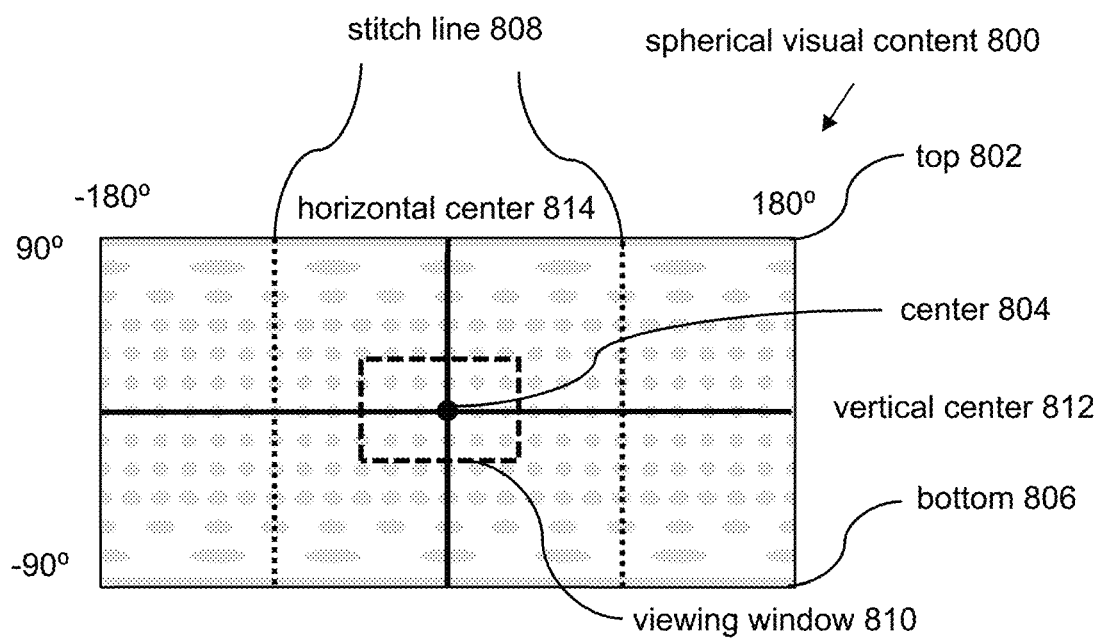
FIG. 8 illustrates example spherical visual content mapped be mapped onto a two-dimensional plane using an equirectangular projection.

For example, FIG. 8 illustrates an example mapping of spherical visual content 800 onto a two-dimensional plane using an equirectangular projection. The mapping of the spherical visual content 800 onto the two-dimensional plane using the equirectangular projection may result in a pixel on the top of the spherical visual content 800 in the three-dimensional space (top 702 shown in FIG. 7) being defined by multiple pixels along the top 802 of the two-dimensional plane, a pixel on the bottom of the spherical visual content 800 in the three-dimensional space (bottom 706 shown in FIG. 7) being defined by multiple pixels along the bottom 806 of the two-dimensional plane, and a pixel in the front of the spherical visual content 800 in the three-dimensional space (point 704 shown in FIG. 7) being defined by a pixel at the center 804 of the two-dimensional plane. The mapping of the spherical visual content 800 onto the two-dimensional plane using the equirectangular projection may result in a stitch line 808 (corresponding to the stitch line 708 in FIG. 7) being positioned within lateral portions of two-dimensional plane. The stitch line 808 may be positioned within left and right lateral portions of the spherical visual content 800 mapped onto the two-dimensional plane using the equirectangular projection. The stitch line 808 may be positioned at −90 horizon degrees and 90 horizontal degrees.

The viewing window component 104 may be configured to determine placement of a viewing window within the spherical field of view of the visual content. The determination of the placement of the viewing window within the spherical field of view of the visual content may include determination of one or more of viewing direction, viewing size, viewing rotation, and/or other parameters of the viewing window. For video content, placement of the viewing window within the spherical field of view of the visual content may be determined as the function of progress through the progress length of the video content.

The viewing window may define one or more extents of the visual content to be included within a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

For example, a viewing window 710 in FIG. 7 may define an extent of the spherical visual content 700 to be included within a punchout of the spherical visual content 700. The extent defined by the viewing window 710 may include a front spatial portion of the spherical visual content 700. For example, the viewing window 710 may include depiction of a portion of a scene in front of the image capture device(s) used to capture the spherical visual content 700. As another example, a viewing window 810 in FIG. 8 may define an extent of the spherical visual content 800 to be included within a punchout of the spherical visual content 800. The extent defined by the viewing window 810 may include a center spatial portion of the spherical visual content 800 mapped onto the two-dimensional plane using the equirectangular projection. In some implementations, the center spatial portion of the spherical visual content 800 defined by the viewing window 810 in the two-dimensional plane may correspond to the front spatial portion of the spherical visual content 800 in the three-dimensional space (e.g., the front spatial portion defined by the viewing window 710).

The viewing window may have a panoramic field of view. The panoramic field of view may refer to may refer to size, shape, and/or aspect ratio of the viewing window. The panoramic field of view of the viewing window may include a wide field of view, a tall field of view, and/or other field of view. The panoramic field of view of the viewing window may include one dimensional field of view (e.g., visible extent in one direction) that is at least as twice as large as another dimensional field of view (e.g., visible extent in perpendicular direction). For example, a wide field of view may have a horizontal field of view that is at least as twice as large as a vertical field of view (aspect ratio of at least 2:1). A tall field of view (e.g., to create vertoramas) may have a vertical field of view that is at least as twice as large as a horizontal field of view (aspect ratio of 1:2 or less). Other aspect ratios of panoramic field of view are contemplated.

For example, the panoramic field of view of the viewing window may include a ninety-degree (or less) vertical field of view and a two-hundred seventy-degree horizontal field of view. Usage of such panoramic field of view may enable presentation/extraction of a wide view depicted within the spherical visual content. In some implementations, the panoramic field of view may be determined based on user input and/or other information. For example, a user may be provided with one or more options to select the panoramic field of view (e.g., horizontal panorama option, vertical panorama option, custom panorama option), and the panoramic field of view may be determined based on the option(s) selected by the user. Other rotations and degrees of panoramic field of view are contemplated.

The panoramic field of view may provide a single continuous view of the scene captured within the spherical visual content. For example, the panoramic field of view may provide a single continuous view of a scenic scene captured within the spherical visual content. The panoramic field of view may emphasize background captured within the spherical visual content. The panoramic field of view may emphasize horizon captured within the spherical visual content. The panoramic field of view may emphasize relationship between one or more subjects (e.g., persons, vehicles, things) and the background/horizon depicted within the spherical visual content. The panoramic field of view may emphasize size and/or length (e.g., width, height) of a subject depicted within the spherical visual content.

Figure 9A:
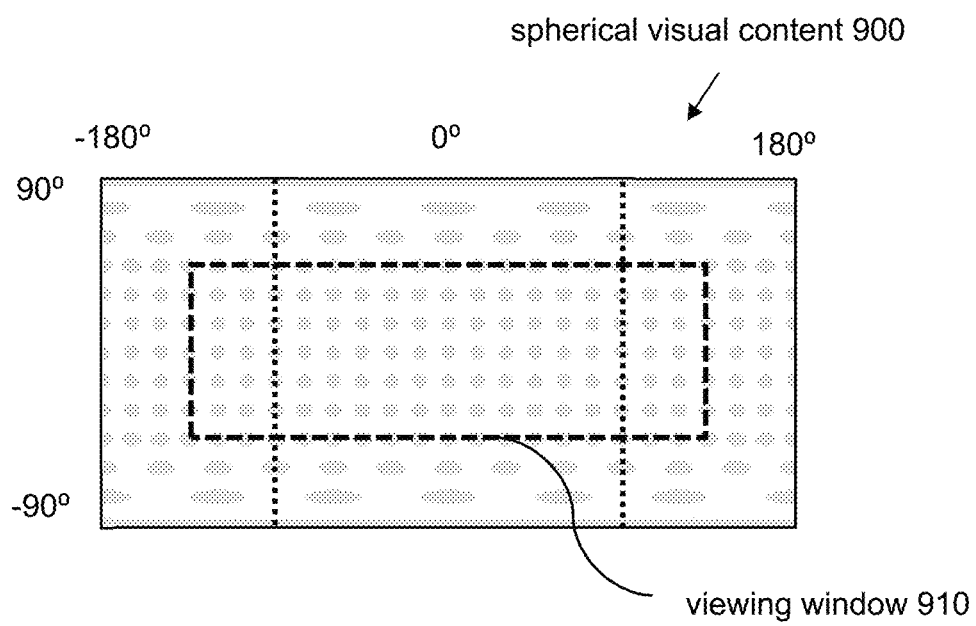
FIGS. 9A and 9B illustrate example placements of viewing window.

In some implementations, the placement of the viewing window within the spherical field of view may be static to provide the same punchout of the visual content. For example, FIG. 9A illustrates an example placement of a viewing window 910 within the field of view of the spherical visual content 900. The viewing window 910 may be placed within the center of the field of view of the spherical visual content 900. The viewing window may extend from −135 horizontal degree to 135 horizontal degree, and from −45 vertical degree to 45 vertical degree. Other static placements of the viewing window are contemplated.

In some implementations, the placement of the viewing window may be determined be located along a vertical center of the visual content mapped onto the two-dimensional plane using the equirectangular projection. A vertical center may refer to a middle vertical position/degree of the visual content mapped onto the two-dimensional plane using the equirectangular projection. The viewing window placed along the vertical center may include the center of the viewing window being located along a vertical center, such as a vertical center 812 shown in FIG. 8.

In some implementations, the placement of the viewing window may be determined be located along a horizontal center of the visual content mapped onto the two-dimensional plane using the equirectangular projection. A horizontal center may refer to a middle horizontal position/degree of the visual content mapped onto the two-dimensional plane using the equirectangular projection. The viewing window placed along the horizontal center may include the center of the viewing window being located along a horizontal center, such as a horizontal center 814 shown in FIG. 8.

The placement of the viewing window along a horizontal center of the visual content mapped onto the two-dimensional plane using the equirectangular projection may result in the stitch line being positioned closer to a lateral edge of the viewing window than to a center of the viewing window. For example, in FIG. 9A, the viewing window 910 may be placed along a horizontal center of the spherical visual content 900 mapped onto the two-dimensional plane using the equirectangular projection. The placement of the viewing window 910 along the horizontal center may result in the stitch line being closer to the left and right edges of the viewing window 910 rather than to the center of the viewing window 910.

In some implementations, the placement of the viewing window may be determined based on identification of one or more things depicted within the visual content and/or other information. Visual content analysis may be performed to identify what things are depicted within the visual content, and the viewing window may be placed within the spherical field of view of the visual content based on the identification. The placement of the viewing window may define framing of the thing(s) depicted within the visual content. The extent of the visual contented defined by the viewing window may define how the portion of the visual content within/defined by the viewing window is framed for inclusion in panoramic visual content.

Figure 9B:
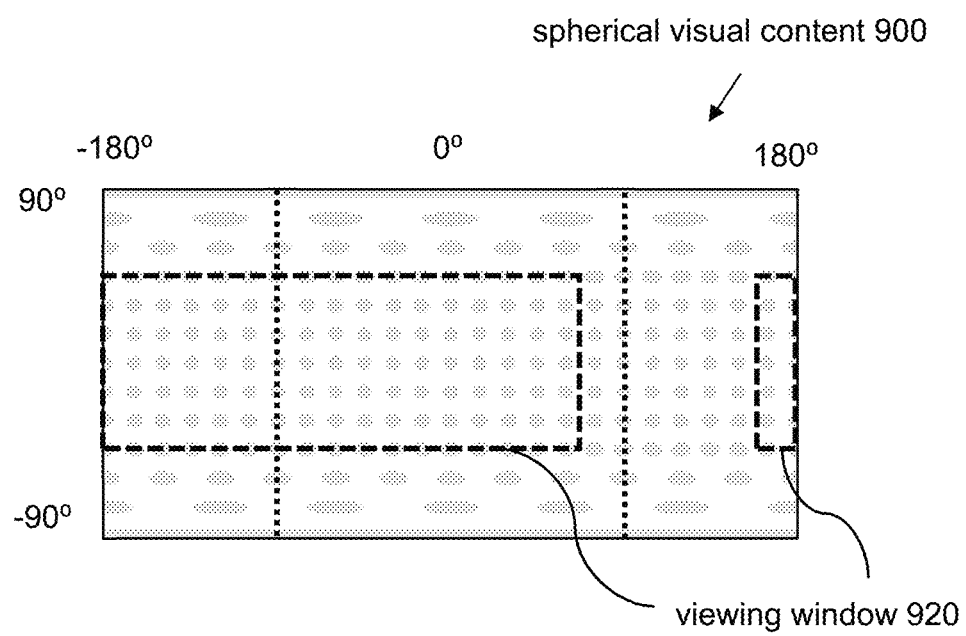

For example, one or more of viewing direction, viewing size, viewing rotation, and/or other parameters of the viewing window may be determined based on content detection and/or other information. Content detection may include detection of one or more things (e.g., persons, faces, objects, environment, emotion, activity, action) depicted within the visual content. One or more of viewing direction, viewing size, viewing rotation, and/or other parameters of the viewing window may be determined based on the content detection so that the panoramic visual content includes portions of the visual content framed based on one or more things depicted within the visual content. For example, the viewing direction of the viewing window (e.g., along a vertical center) may be determined based on content detection to include a particular framing of one or more things depicted within the visual content. For instance, FIG. 9B illustrate an example placement of a viewing window 920. The viewing direction of the viewing window 920 may be determined based on identification of thing(s) depicted within the spherical visual content 900. The viewing direction may be determined to be located to the left of the horizontal center (e.g., include a non-front centered view of the spherical visual content 900). Change in viewing direction of the viewing window as a function of progress through progress length of video content may simulate panning. For example, movement of the viewing window may simulate panning of the image capture device during visual content capture (e.g., panning up and down, side to side).

In some implementations, the panoramic field of view may change as the function of progress through the progress length to simulate changes in zoom within a panoramic video. For example, the horizontal and/or vertical field of view included within the panoramic field of view may change to change the viewing size of the viewing window. Changes in the viewing size (size of the viewing window) as the function of progress through the progress length may simulate changes in zoom of the visual content. The viewing size may be increased to simulate decrease in zoom of the visual content. The viewing size may be decreased to simulate increase in zoom of the visual content.

Figure 10A:
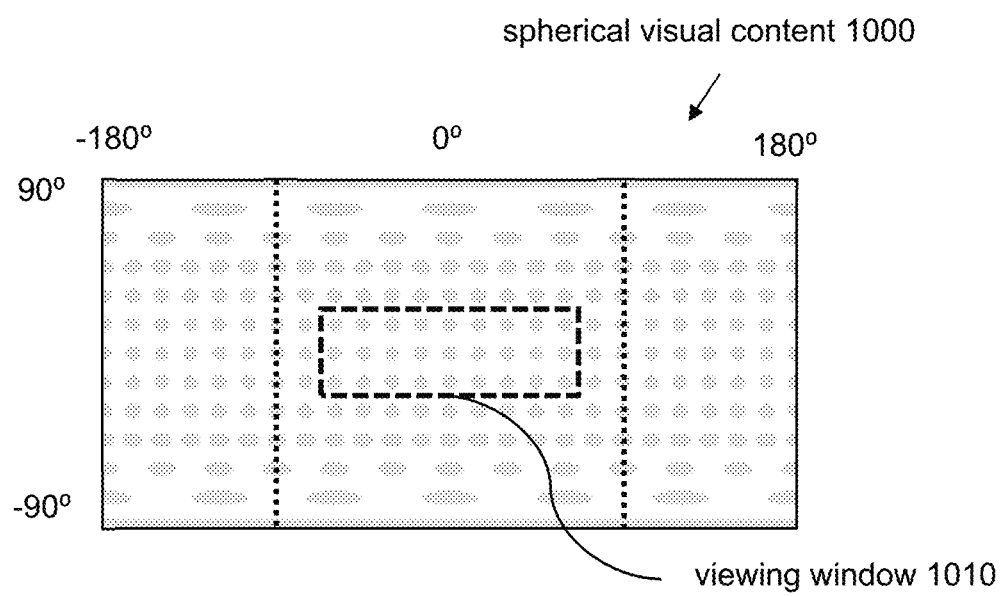
FIGS. 10A and 10B illustrate example placements of viewing window.
Figure 10B:
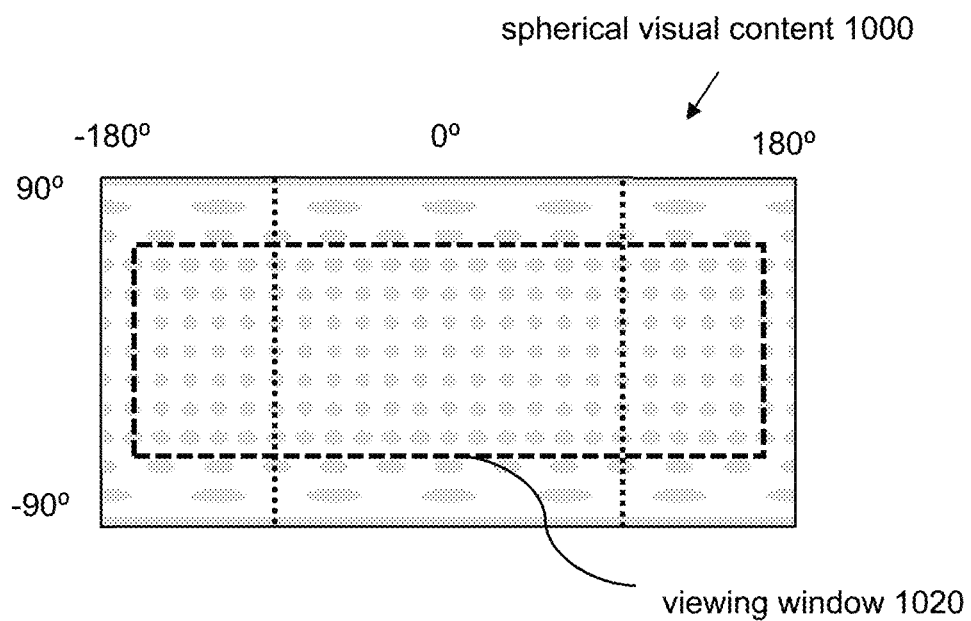

For example, FIGS. 10A and 10B illustrate example placements of viewing windows 1010, 1020 with different viewing sizes. The viewing size of the viewing window 1010 may be smaller than the viewing size of the viewing window 1020. The smaller viewing size of the viewing window 1010 may provide a view of spherical visual content 1000 that is more zoomed in than a view of the spherical visual content 100 provided by the viewing window 1020.

In some implementations, the placement of the viewing window may be determined based on a depiction of a horizon within the visual content. A horizon may refer to a line that appears to separate the visual content into two portions. A horizon may extend across majority or entirety of the visual content. For example, a horizon may refer to a line where the earth (e.g., ground, sea) appears to meet the sky. The placement of the viewing window may be determined to include a depiction of a horizon within the visual content at a vertical position fixed relative to a height (vertical dimension) of the viewing window. The placement of the viewing window may be determined to include a depiction of a horizon within the visual content at a vertical position fixed relative to a height (vertical dimension) of the viewing window during changing of the panoramic field of view (e.g., change in one or more of viewing direction, viewing size, viewing rotation). For example, the placement of the viewing window may be determined to include a depiction of a horizon within the visual content at a vertical position located ⅓ or ⅔ of the height of the viewing window during changing of the viewing size of the viewing window. Other vertical positions fixed relative to the height of the viewing window are contemplated.

Figure 11A:
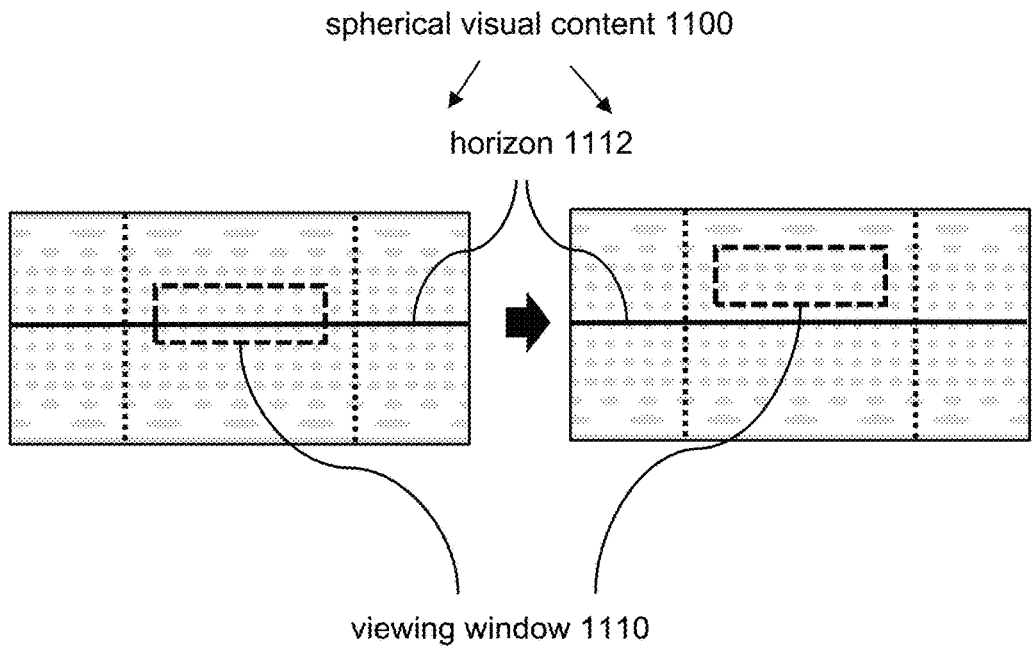
FIGS. 11A and 11B illustrate example placements of viewing window.
Figure 11B:
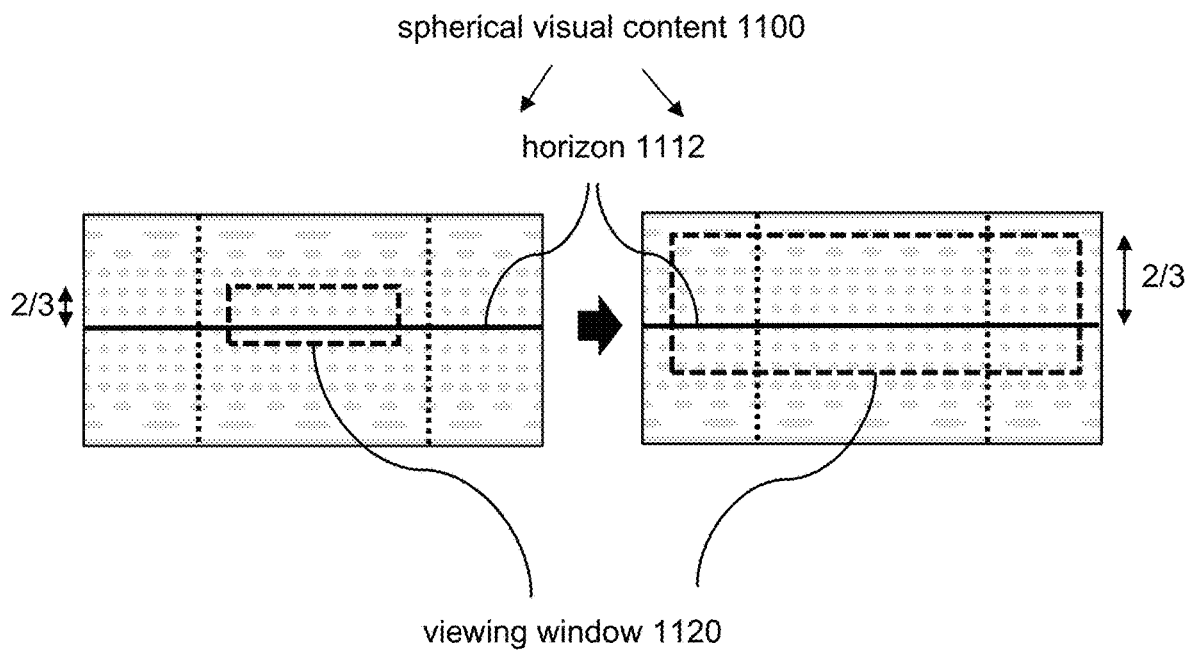

FIGS. 11A and 11B illustrate example placements of viewing windows 1110, 1120. The placements of the viewing windows 1110, 1120 may change to include different extents of the spherical visual content 1100 (e.g., at different moments within progress length of a spherical video). In FIG. 11A, the viewing window 1110 may move up so that the viewing window 1110, and the movement of the viewing window 1110 may cause depiction of a horizon 1112 from being included within the viewing window 1110 to not being included within the viewing window 1110. That is, change in the placement of the viewing window 1110 may cause the horizon 1112 to move out of the viewing window 1110.

In some implementations, it may be important to include depiction of horizon within the viewing window/panoramic visual content. The panoramic field of view of the viewing window may emphasize horizon captured within the spherical visual content, and not including the depiction of the horizon may result in loss of visual impact provided by the panoramic view of the viewing window/panoramic visual content. The panoramic field of view of the viewing window may emphasize relationship between one or more subjects (e.g., persons, vehicles, things) and the background/horizon depicted within the spherical visual content, and not including the depiction of the horizon may result in loss of the relationship between the subject(s) and the background/horizon depicted within the spherical visual content. For instance, the horizon 1112 may provide a frame of reference for subject(s) depicted within the spherical visual content 1100 and movement of the viewing window 1110 to not include the horizon 1112 may result in loss of the frame of reference for the subject(s).

To keep the depiction of horizon within the viewing window/panoramic visual content, the viewing size of the viewing window may be changed. That is, the viewing size (horizontal and/or vertical field of view) of the viewing window may be increased and/or decreased to preserve the depiction of horizon within the viewing window/panoramic visual content.

For example, in FIG. 11B, the placement of the viewing window 1120 may be determined so that the depiction of the horizon 1112 is located at a vertical position located ⅓ of the height of the viewing window 1120 from the bottom. The vertical position of the depiction of the horizon 1112 may remain fixed during increase in viewing size of the viewing window 1120 so that the depiction of the horizon 1112 remains at the vertical position located ⅓ of the height of the viewing window 1120 from the bottom. Such change in the placement of the viewing window 1120 may result in the viewing window 1120 including the extent of the spherical visual content 1100 defined by the viewing window 1110 while keeping the depiction of the horizon 1112. Such change in the placement of the viewing window 1120 may result in the panoramic visual content include the depiction of the horizon 1112 at the same location. That is, during change in zoom of the visual content simulated by the change in viewing size, the location of the horizon 1112 depicted within the panoramic visual content may remain the same (e.g., ⅓ of the height of the panoramic visual content).

The generation component 106 may be configured to generate the panoramic visual content based on the viewing window and/or other information. The panoramic visual content may include a punchout of the extent(s) of the visual content within the viewing window. The panoramic visual content may be generated to provide a panoramic view of the visual content. Inclusion of the extent(s) of the visual content defined by the viewing window within the panoramic visual content may effectuate panoramic viewing of the visual content via selective cropping. In some implementations, the panoramic visual content may be generated from visual content of a spherical video for inclusion in a panoramic video. The panoramic visual content may be generated as the function of progress through the progress length of a spherical video for inclusion in a panoramic video. Generation of the panoramic visual content using a punchout of visual content including spherical field of view (spherical visual content) may generate higher quality (e.g., less stitching artifact, less intraframe motion) panoramic visual content than may be generated from panning of image capture device (e.g., swiveling the image capture device left to right) to capture a panoramic field of view over a time duration. Generation of the panoramic visual content using a punchout of visual content including spherical field of view may enable straight forward generation of panoramic video via selective cropping.

In some implementations, generation of the panoramic visual content based on the viewing window may include cropping of one or more extents of the visual content outside the viewing window. For example, in FIG. 7, panoramic visual content may be generated by cropping extents of the spherical visual content 700 outside the viewing window 710. In FIG. 8, panoramic visual content may be generated by cropping extents of the spherical visual content 800 outside the viewing window 810. In FIG. 9A, panoramic visual content may be generated by cropping extents of the spherical visual content 900 outside the viewing window 910. In FIG. 9B, panoramic visual content may be generated by cropping extents of the spherical visual content 900 outside the viewing window 920. In FIG. 10A, panoramic visual content may be generated by cropping extents of the spherical visual content 1000 outside the viewing window 1010. In FIG. 10B, panoramic visual content may be generated by cropping extents of the spherical visual content 1000 outside the viewing window 1020. In FIG. 11A, panoramic visual content may be generated by cropping extents of the spherical visual content 1100 outside the viewing window 1110. In FIG. 11B, panoramic visual content may be generated by cropping extents of the spherical visual content 1100 outside the viewing window 1120. Other generation of panoramic visual content based on viewing window are contemplated.

In some implementation, the visual content may be mapped onto a sphere, and generation of the panoramic visual content based on the viewing window may include rotation of the sphere to position the extent of the visual content defined by the viewing window at a location of the sphere to be punched out. For example, the sphere may be rotated to position the extent of the visual content defined by the viewing window at a location of the sphere corresponding to a center portion of the visual content mapped onto a two-dimensional plane (e.g., using an equirectangular projection). The extent(s) of the visual content outside the center portion may be cropped out to generate the panoramic visual content.

Figure 14:
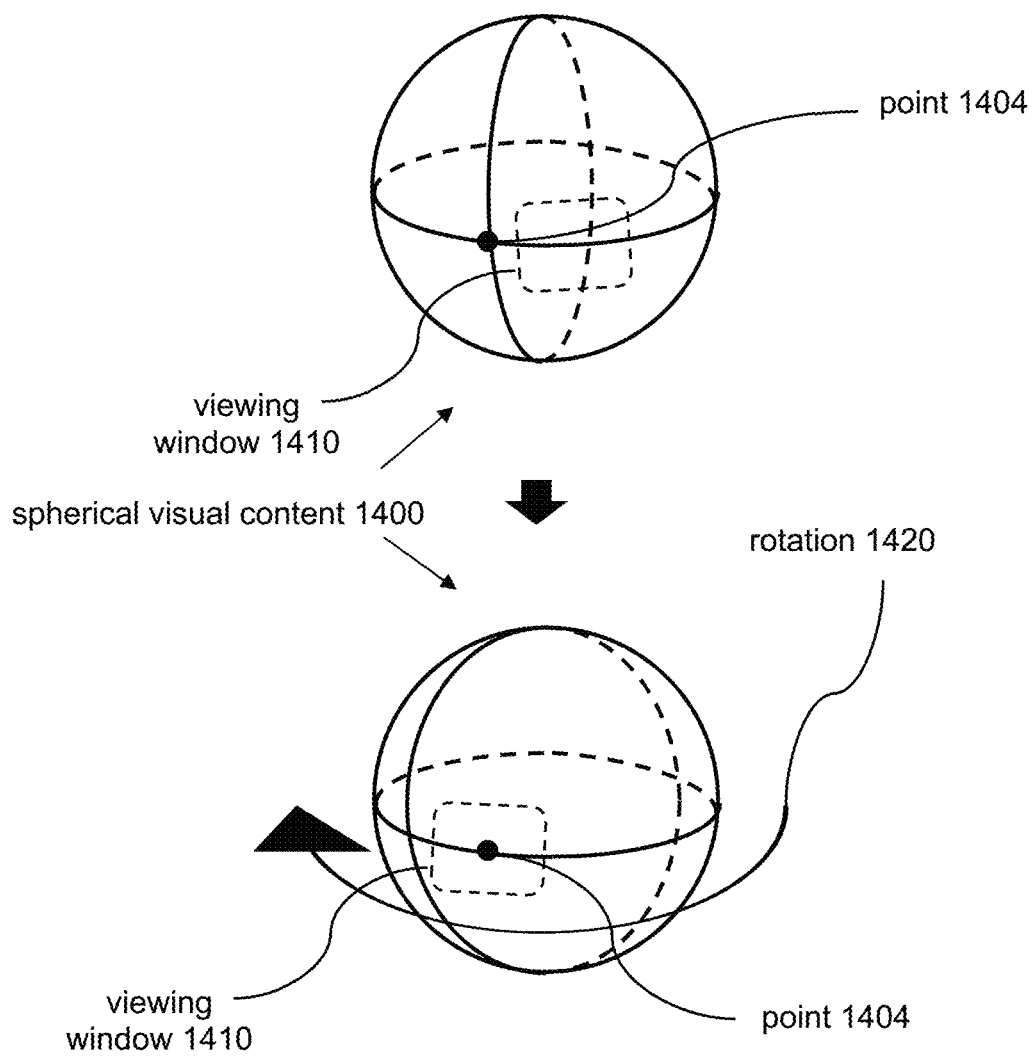
FIG. 14 illustrates example rotation of spherical visual content.

For instance, FIG. 14 illustrates an example rotation of spherical visual content 1400. The spherical visual content 1400 may be mapped onto a sphere, with a point 1404 corresponding to a front point of the sphere. A viewing window 1410 for generating panoramic visual content may be positioned at front-left portion of the sphere. The extent within the viewing window 1410 may be punched out by (1) mapping the spherical visual content 1400 onto a two-dimensional plane (e.g., using an equirectangular projection) and positioning the viewing window within the two-dimensional plane to the left of the center. In some implementations, the viewing window may be fixed at the center of the two-dimensional plane, and the sphere may be rotated to bring the desired extent of the spherical visual content to the location of the sphere corresponding to the center portion of the two-dimensional plane. For example, as shown in FIG. 14, the sphere may be rotated by a rotation 1420 so that the extent of the spherical visual content 1400 defined by the viewing window 1410 is located at the front portion of the sphere. The front portion of the sphere may correspond to the center portion of the visual content mapped onto the two-dimensional plane, with the extent within the center portion being punched-out to generate the panoramic visual content. Thus, the location of the viewing window in the two-dimensional plane may remain fixed and the visual content may be rotated to fit the desired extent of the visual content within the viewing window.

In some implementations, the panoramic visual content may be generated as an encoded version/copy of the panoramic visual content (e.g., encoded image/video file) and/or a director track that defines the extents of the visual content to be used during presentation. For example, the panoramic visual content may be generated as one or more images and/or video frames in a video file. The image(s)/video may be opened for presentation of the panoramic visual content. The panoramic visual content may be generated as instructions to render the visual content for presentation. The instructions (e.g., director track) may which define visual portions of the visual content (e.g., which portions of spherical images, spherical video frames) should be included within the presentation of the visual content. The instructions may include information on the placement of the viewing window/punchout of the spherical image(s)/spherical video frames to be used to provide a panoramic view of the spherical image(s)/spherical video frames. An image/video application may use the instructions to retrieve the relevant visual portions of the spherical image(s)/spherical video frames when the visual content is opened and/or is to be presented.

The generation component 106 may be configured effectuate storage of the panoramic visual content and/or other information in one or more storage media. For example, the panoramic visual content (e.g., image file, video file, director track) may be stored in the electronic storage 13, remote storage locations (storage media located at/accessible through a server), and/or other locations. In some implementations, the generation component 106 may effectuate storage of the panoramic visual content through one or more intermediary devices. For example, the processor 11 may be located within a computing device without a connection to the storage device (e.g., the computing device lacks WiFi/cellular connection to the storage device). The generation component 106 may effectuate storage of the panoramic visual content through another device that has the necessary connection (e.g., the computing device using a WiFi/cellular connection of a paired mobile device, such as a smartphone, tablet, laptop, to store information in one or more storage media). Other storage locations for and storage of the panoramic visual content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
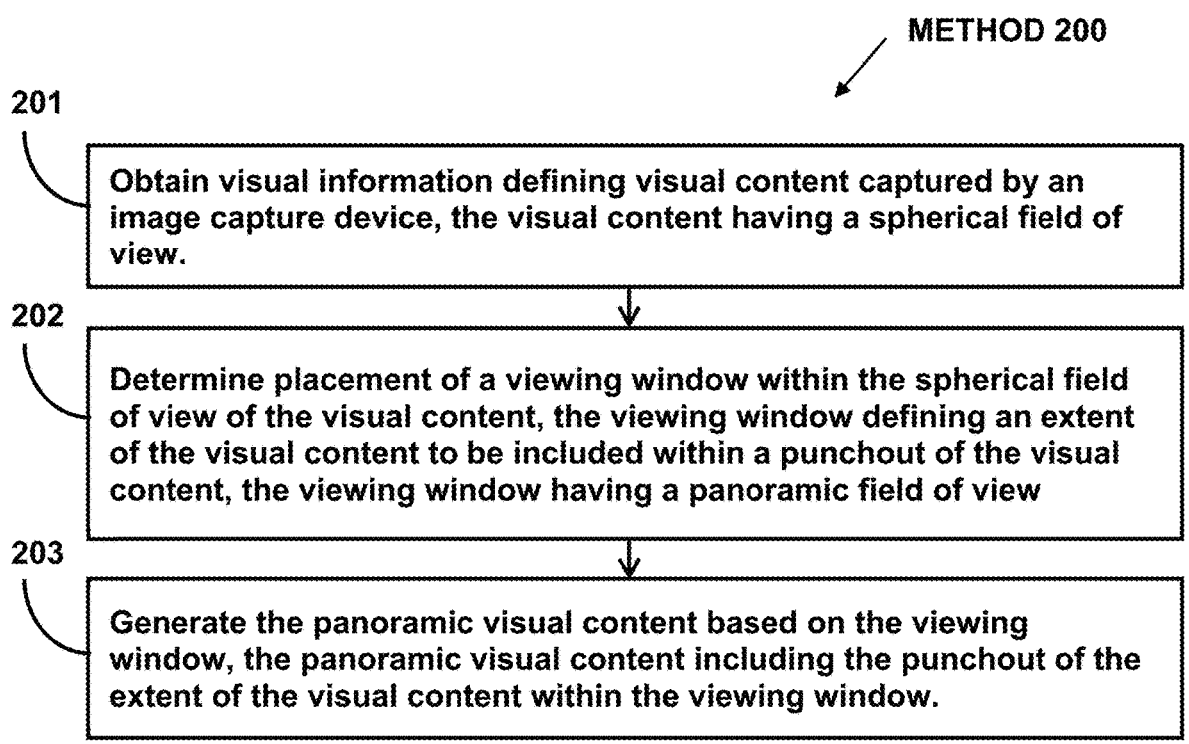
FIG. 2 illustrates an example method for generating panoramic visual content.

FIG. 2 illustrates method 200 for generating panoramic visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information and/or other information may be obtained. The visual information may define visual content captured by an image capture device. The visual content may have a spherical field of view. In some implementation, operation 201 may be performed by a processor component the same as or similar to the visual information component 102 (Shown in FIG. 1 and described herein).

At operation 202, placement of a viewing window within the spherical field of view of the visual content may be determined. The viewing window may define an extent of the visual content to be included within a punchout of the visual content. The viewing window may have a panoramic field of view. In some implementation, operation 202 may be performed by a processor component the same as or similar to the viewing window component 104 (Shown in FIG. 1 and described herein).

At operation 203, the panoramic visual content may be generated based on the viewing window and/or other information. The panoramic visual content may include the punchout of the extent of the visual content within the viewing window. In some implementation, operation 203 may be performed by a processor component the same as or similar to the generation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that generates panoramic visual content, the system comprising:
 one or more physical processors configured by machine-readable instructions to:
  obtain visual information defining visual content captured by an image capture device, the visual content having a spherical field of view, wherein the visual content having the spherical field of view is generated based on stitching of first visual content and second visual content, the first visual content captured using a first optical element of the image capture device and the second visual content captured using a second optical element of the image capture device, the first optical element having a first field of view and the second optical element having a second field of view, the first optical element and the second optical element carried by the image capture device such that a peripheral portion of the first field of view and a peripheral portion of the second field of view overlap, the overlap of the peripheral portion of the first field of view and the peripheral portion of the second field of view enabling spherical capture of the visual content, a stitch line for stitching of the first visual content and the second visual content positioned within the overlap, further wherein the stitch line is positioned within lateral portions of the visual content mapped onto a two-dimensional plane using an equirectangular projection;
  determine placement of a viewing window within the spherical field of view of the visual content, the viewing window defining an extent of the visual content to be included within a punchout of the visual content, the viewing window having a panoramic field of view, wherein the placement of the viewing window is determined to be located along a horizontal center of the visual content mapped onto the two-dimensional plane using the equirectangular projection such that the stitch line is positioned closer to a lateral edge of the viewing window than to a center of the viewing window; and
  generate the panoramic visual content based on the viewing window, the panoramic visual content including the punchout of the extent of the visual content within the viewing window.

2. The system of claim 1, wherein the panoramic field of view includes a ninety-degree vertical field of view and a two-hundred seventy-degree horizontal field of view.

3. The system of claim 1, wherein:
 the placement of the viewing window is determined to be located along a vertical center of the visual content mapped onto the two-dimensional plane using the equirectangular projection; and
 generation of the panoramic visual content based on the viewing window includes cropping of an extent of the visual content outside the viewing window.

4. The system of claim 1, wherein:
 the visual information defines the visual content of a spherical video having a progress length such that the visual content is defined as a function of progress through the progress length;

the panoramic visual content is generated as the function of progress through the progress length for inclusion in a panoramic video.

5. The system of claim 4, wherein the panoramic field of view changes as the function of progress through the progress length to simulate changes in zoom within the panoramic video.

6. The system of claim 5, wherein the placement of the viewing window is determined to include a depiction of a horizon within the visual content at a vertical position fixed relative to a height of the viewing window during changing of the panoramic field of view.

7. The system of claim 4, wherein the visual content of the spherical video is rotated as the function of progress through the process length based on rotational positions of the image capture device during capture of the visual content, the rotation of the visual content resulting in the visual content being oriented in a top-down manner such that the visual content is aligned with a direction of gravity on the image capture device during capture of the visual content.

8. The system of claim 7, wherein the placement of the viewing window is determined based on identification of a thing depicted within the visual content, the placement of the viewing window defining framing of the thing depicted within the visual content.

9. The system of claim 8, wherein the visual content is mapped onto a sphere, and generation of the panoramic visual content based on the viewing window includes:
    rotation of the sphere to position the extent of the visual content defined by the viewing window at a location of the sphere corresponding to a center portion of the visual content mapped onto a two-dimensional plane using an equirectangular projection; and
    crop of an extent of the visual content outside the center portion.

10. A method for generating panoramic visual content, the method performed by a computing system including one or more processors, the method comprising:
    obtaining, by the computing system, visual information defining visual content captured by an image capture device, the visual content having a spherical field of view, wherein the visual content having the spherical field of view is generated based on stitching of first visual content and second visual content, the first visual content captured using a first optical element of the image capture device and the second visual content captured using a second optical element of the image capture device, the first optical element having a first field of view and the second optical element having a second field of view, the first optical element and the second optical element carried by the image capture device such that a peripheral portion of the first field of view and a peripheral portion of the second field of view overlap, the overlap of the peripheral portion of the first field of view and the peripheral portion of the second field of view enabling spherical capture of the visual content, a stitch line for stitching of the first visual content and the second visual content positioned within the overlap, further wherein the stitch line is positioned within lateral portions of the visual content mapped onto a two-dimensional plane using an equirectangular projection;
    determining, by the computing system, placement of a viewing window within the spherical field of view of the visual content, the viewing window defining an extent of the visual content to be included within a punchout of the visual content, the viewing window having a panoramic field of view, the placement of the viewing window is determined to be located along a horizontal center of the visual content mapped onto the two-dimensional plane using the equirectangular projection such that the stitch line is positioned closer to a lateral edge of the viewing window than to a center of the viewing window; and
    generating, by the computing system, the panoramic visual content based on the viewing window, the panoramic visual content including the punchout of the extent of the visual content within the viewing window.

11. The method of claim 10, wherein the panoramic field of view includes a ninety-degree vertical field of view and a two-hundred seventy-degree horizontal field of view.

12. The method of claim 10, wherein:
    the placement of the viewing window is determined to be located along a vertical center of the visual content mapped onto the two-dimensional plane using the equirectangular projection; and
    generating the panoramic visual content based on the viewing window includes cropping of an extent of the visual content outside the viewing window.

13. The method of claim 10, wherein:
    the visual information defines the visual content of a spherical video having a progress length such that the visual content is defined as a function of progress through the progress length;
    the panoramic visual content is generated as the function of progress through the progress length for inclusion in a panoramic video.

14. The method of claim 13, wherein the panoramic field of view changes as the function of progress through the progress length to simulate changes in zoom within the panoramic video.

15. The method of claim 14, wherein the placement of the viewing window is determined to include a depiction of a horizon within the visual content at a vertical position fixed relative to a height of the viewing window during changing of the panoramic field of view.

16. The method of claim 13, wherein the visual content of the spherical video is rotated as the function of progress through the process length based on rotational positions of the image capture device during capture of the visual content, the rotation of the visual content resulting in the visual content being oriented in a top-down manner such that the visual content is aligned with a direction of gravity on the image capture device during capture of the visual content.

17. The method of claim 16, wherein the placement of the viewing window is determined based on identification of a thing depicted within the visual content, the placement of the viewing window defining framing of the thing depicted within the visual content.

18. The method of claim 17, wherein the visual content is mapped onto a sphere, and generating the panoramic visual content based on the viewing window includes:
    rotating the sphere to position the extent of the visual content defined by the viewing window at a location of the sphere corresponding to a center portion of the visual content mapped onto a two-dimensional plane using an equirectangular projection; and
    cropping an extent of the visual content outside the center portion.

* * * * *